(12) United States Patent
Buehl et al.

(10) Patent No.: US 7,620,574 B2
(45) Date of Patent: Nov. 17, 2009

(54) CABLE BILLING SYSTEMS AND METHODS ENABLING INDEPENDENCE OF SERVICE MARKETING AND PROVISIONING FROM BILLING AND COLLECTION OF REVENUE

(75) Inventors: Joseph G. Buehl, Studio City, CA (US); Darryl Lanay DeFreese, Lawrenceville, GA (US)

(73) Assignees: N2 Broadband, Inc., Duluth, GA (US); Time Warner Cable (division of Time Warner Entertainment Company, L.P), Stamford, CT (US)

( * ) Notice: Subject to any disclaimer, the term of this patent is extended or adjusted under 35 U.S.C. 154(b) by 1510 days.

(21) Appl. No.: 10/054,719

(22) Filed: Jan. 18, 2002

(65) Prior Publication Data
US 2002/0129358 A1 Sep. 12, 2002

Related U.S. Application Data

(60) Provisional application No. 60/263,176, filed on Jan. 22, 2001.

(51) Int. Cl.
G07F 19/00 (2006.01)
(52) U.S. Cl. ............................................. 705/34; 725/1
(58) Field of Classification Search .................... 705/34; 725/1
See application file for complete search history.

(56) References Cited

U.S. PATENT DOCUMENTS

| | | | | |
|---|---|---|---|---|
| 3,531,586 A | * | 9/1970 | Waller et al. ................ | 725/151 |
| 4,484,217 A | * | 11/1984 | Block et al. .................... | 725/1 |
| 4,486,773 A | * | 12/1984 | Okubo ........................... | 725/2 |
| 5,852,812 A | * | 12/1998 | Reeder .......................... | 705/39 |
| 5,963,925 A | * | 10/1999 | Kolling et al. ................ | 705/40 |
| 5,987,430 A | * | 11/1999 | Van Horne et al. ............ | 705/34 |
| 6,385,595 B1 | * | 5/2002 | Kolling et al. ................ | 705/40 |
| 6,456,986 B1 | * | 9/2002 | Boardman et al. .......... | 705/400 |
| 6,493,680 B2 | * | 12/2002 | Logan et al. .................. | 705/34 |
| 6,493,685 B1 | * | 12/2002 | Ensel et al. ................... | 705/40 |
| 6,760,409 B1 | * | 7/2004 | Lipton et al. ............... | 379/67.1 |
| 6,990,182 B2 | * | 1/2006 | Nelson ..................... | 379/114.2 |
| 7,062,467 B2 | * | 6/2006 | Sako et al. ..................... | 705/52 |
| 7,231,367 B1 | * | 6/2007 | Alfvin et al. .................. | 705/40 |

(Continued)

OTHER PUBLICATIONS

Metadata: VOD's Lingering Challenge Jim Riley. Multichannel News. New York: Apr. 7, 2003. vol. 24, Iss. 14; p. 22A.*
Triveni Digital and Chyron Corporation Team Up to Bring Live Interactive TV Enhancements to DTV Broadcast Stream Business Editors. Business Wire. New York: Mar. 21, 2001. p. 1.*

Primary Examiner—Matthew S Gart
Assistant Examiner—Oluseye Iwarere
(74) Attorney, Agent, or Firm—Alston & Bird LLP (57) ABSTRACT

Systems and methods that divide the billing function of a billing system from the provisioning function of a service in digital cable systems. Because the billing system is only responsible for billing, rather than the provisioning of services, new services may be quickly added to cable systems without the time consuming and expensive task of configuring the billing system specifically for new services added to the system. The services are implemented using an offering package created by the service, where the offering package contains billing related information forwarded to the billing system to bill for the service.

15 Claims, 4 Drawing Sheets

U.S. PATENT DOCUMENTS

| | | | |
|---|---|---|---|
| 2001/0016831 A1* | 8/2001 | Marsh et al. | 705/34 |
| 2001/0027561 A1* | 10/2001 | White et al. | 725/1 |
| 2001/0037269 A1* | 11/2001 | Marsh et al. | 705/34 |
| 2002/0023268 A1* | 2/2002 | LaRocca et al. | 725/87 |
| 2002/0103731 A1* | 8/2002 | Barnard et al. | 705/34 |
| 2003/0083968 A1* | 5/2003 | Marsh et al. | 705/34 |

* cited by examiner

CABLE BILLING SYSTEMS AND METHODS ENABLING INDEPENDENCE OF SERVICE MARKETING AND PROVISIONING FROM BILLING AND COLLECTION OF REVENUE

RELATED APPLICATION DATA

The present application claims priority from U.S. Provisional Patent Application No. 60/263,176, titled "Service Offering Price Computation", filed on Jan. 22, 2001, the entire contents of which are incorporated by reference herein.

FIELD OF THE INVENTION

This invention relates in general to the field of cable systems, and more particularly, to billing for services in digital cable systems.

BACKGROUND OF THE INVENTION

Historically, television services have been comprised of analog broadcast audio and video signals. Cable television systems now receive broadcasts and retransmit them with other programming to users over land-line networks, typically comprising fiber optic cable and coaxial cable. With the recent advent of digital transmission technology, cable television systems are now capable of providing much more than the traditional analog broadcast video. For instance, two-way and advanced one-way communications between a subscriber and a cable system headend are now possible.

In implementing enhanced programming, the home communication terminal, otherwise known as the set-top box, has become an important computing device for accessing video services and navigating a subscriber through a maze of available services. In addition to supporting traditional analog broadcast video functionality, digital set-top boxes now also support an increasing number of services which are digital two-way communications, such as video-on-demand, email and web-browsing. These are all in addition to the host of other television services which are increasingly being demanded by consumers, examples of which include audio and audio/visual programming, advanced navigation controls, impulse pay-per-view technology, and on-line commerce.

With the addition of interactive services, increased bandwidth and the emergence of bi-directional communication capabilities available through a digital television system, there is a need to provide standard methods and systems for billing services provided by and accessed by a subscriber from service providers. Currently, billing systems are integrated into cable systems such that the billing vendors are responsible not only for billing for a service, but for provisioning the service in the system. The billing component of the cable system is typically outsourced to billing vendors, which manually update customer lists each time a new customer is added by the cable system and send out bills every month. This structure has operated well for many years, as the cable industry originally had only one service offering—video. However, cable evolved to offer channels and services that required customers to need a subscription. Additionally, interactive services such as PPV were created, in which a subscriber can contact the cable company and instantly request a particular movie.

Up until recently there have not been many new services added to cable systems, and conventional billing system vendors could write new code to account for the different requirements of each service. These requirements included not only executing billing for a service, but in fulfilling the service because the billing system must send a message to the network controller indicating that a service should be provided to a subscriber who has been authorized. Therefore, if a subscriber called up the cable company and requested a PPV movie, a customer service representative would be operating a terminal running software provided by the billing vendor that tells the network controller to authorize the STB to play the movie. The billing vendor would then make a record of that purchase.

Now, with interactive services such as AOL TV, service providers have to go to billing vendors each time a new service is rolled out, which is inefficient due to the expense and time required to modify billing software. Typically a year or more is required for a billing vendor to implement a new service. Therefore, what is needed is a billing system that is not involved in the fulfillment of a service while retaining all of the necessary billing and authorization functions of a conventional billing system.

SUMMARY OF THE INVENTION

The present invention provides for a billing system that allows a billing entity to authorize and bill subscribers without requiring that the billing system be included in the fulfillment of service.

According to one embodiment of the invention, there is disclosed a digital delivery system facilitating the provisioning and billing of a service offered to subscribers. The delivery system includes at least one service, where the at least one service generates an offering marketed to a subscriber of the digital delivery system, and wherein the offering comprises metadata and a price algorithm. The system also includes a billing system in communication with the at least one service, where the billing system is capable of interpreting the metadata to generate a bill corresponding to the offering.

According to one aspect of the invention, the billing system maintains at least one table comprising tax-related information associated with the offering. According to another aspect of the invention, the metadata includes a plurality of billing items, where the billing system identifies at least one of the billing items for inclusion in the metadata.

The digital delivery system of the present invention can also include a marketing component that provides marketing data associated with the offering to the price algorithm, and a network controller in communication with the at least one service, for provisioning the offering to a set-top box. The price algorithm can compute an offering price for the offering. Additionally, the network controller may be in indirect communication with the billing system.

According to another embodiment of the invention, there is disclosed an offering that facilitates the provisioning and billing of a service to a subscriber in a digital delivery system. The offering includes metadata and a price algorithm. The metadata comprises billing related information identified by a billing system and generated by the service, where the metadata is utilized by the billing system to compute a bill for the offering. The price algorithm generates a list price for the offering, where the list price is used by the billing system to compute a bill for the offering.

According to one aspect of the invention, the offering corresponds to a line item on a bill generated by the billing system. Furthermore, the price algorithm can generate a list price for the offering based upon marketing data associated with the offering. According to another aspect of the invention, the marketing data is provided by a marketing component, which may include a cable company marketing department.

According to yet another embodiment of the invention, there is disclosed a method of facilitating the provisioning and billing of a service in a digital delivery system. The method includes generating an offering representing an item for purchase from a service, and forwarding metadata within the offering to a billing system such that the billing system can generate a bill for the offering based upon the metadata. Generating an offering includes querying a billing system to determine billing related metadata interpretable by the billing system, and creating the offering, where the offering comprises metadata corresponding to the billing related metadata identified by the billing system.

According to one aspect of the invention, creating an offering further includes creating an offering comprising a price algorithm, where the price algorithm is utilized to compute a list price for the offering. The method can also include generating a bill at the billing system for the offering based upon the metadata. Generating a bill for the offering based upon the metadata can also include accessing at least one tax related table in the billing system to determine taxes associated with the offering. According to another aspect of the invention, the method can further include provisioning the offering to a subscriber of the digital delivery system, where the provisioning is implemented by the service, rather than the billing system. Furthermore, provisioning the offering can further include determining whether the subscriber is authorized to receive the offering, wherein the determination is executed by the billing system. Additionally, provisioning the offering can include instructing a network controller to distribute content associated with the offering.

Many objects, features and advantages of the present invention will become apparent to one of ordinary skill in the art upon examination of the following drawings and detailed description.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
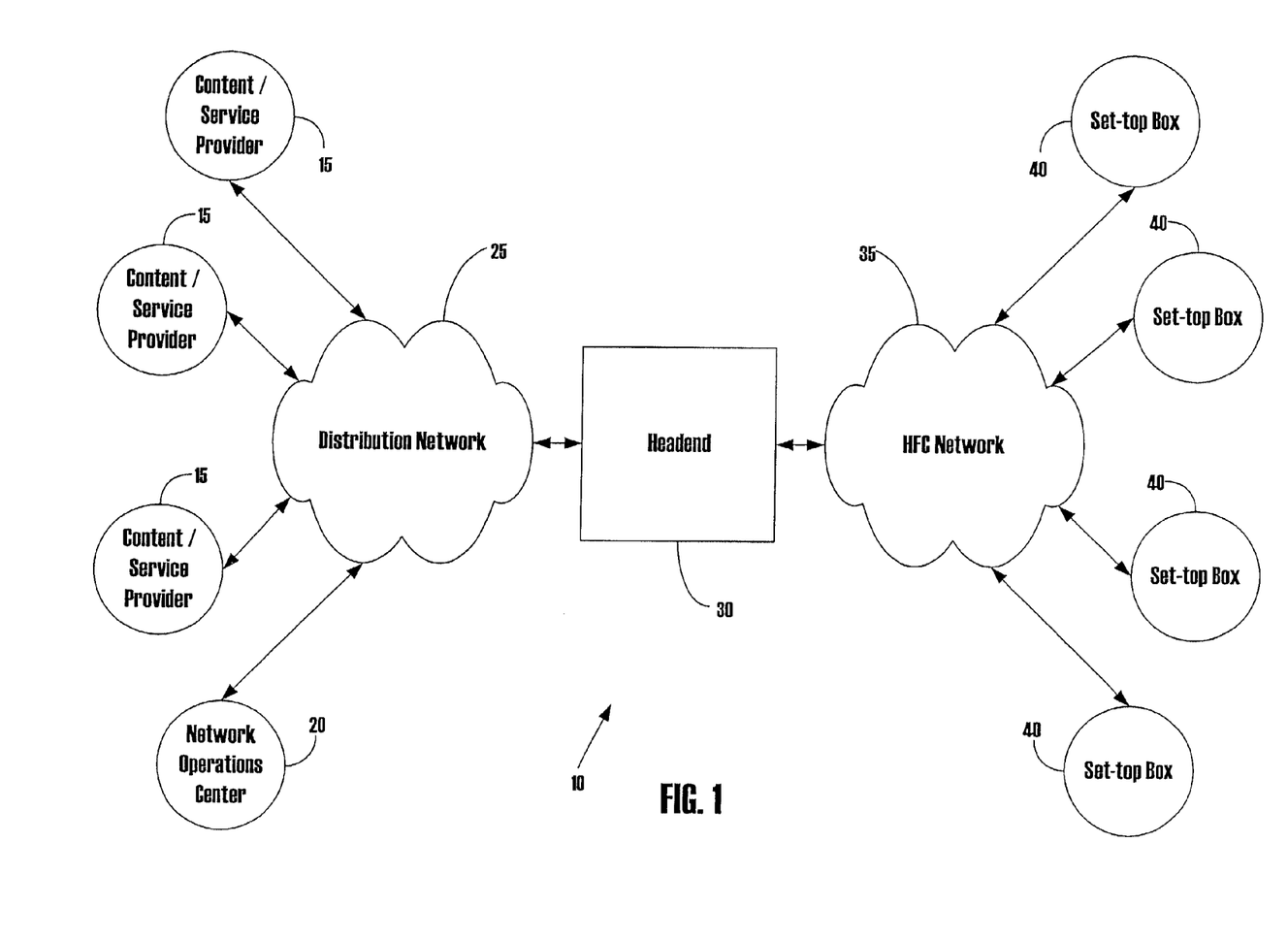
FIG. 1 is a high-level block diagram view of a Digital Distribution and Delivery System in accordance with an embodiment of the present invention.

FIG. 1 shows a block diagram view of a digital distribution and delivery system (DDDS) 10. Generally, the DDDS 10 is a an integrated network system that features video, audio, voice and data services transmitted to Cable television (TV) subscribers. Although FIG. 1 depicts a high level view of a DDDS 10 including a single HFC Network 35, as will be described below, it should be appreciated that a plurality of DDDSs including multiple HFC Networks can tie together a plurality of regional networks into an integrated global network so that Cable TV subscribers can receive content provided from anywhere in the world. The DDDS 10 delivers broadcast video signals as digitally formatted signals in addition to delivering traditional broadcast analog video signals. Furthermore, the DDDS 10 can support one-way broadcast services as well as both one-way data services and two-way media and data services. The two-way operation of the network allows for user interactivity with services, such as Pay-Per-View programming, Near Video-On-Demand (NVOD) programming (according to any of several known NVOD implementation methods), Video-on-Demand (VOD) programming (according to any of several known VOD implementation methods), and interactive applications, such as Internet connections and interactive services that render real-time bi-directional communication on a personalized basis such as bi-directional audio-visual communication.

The DDDS 10 also provides the interfaces, network control, transport control, session control, and servers to establish on-demand session-based bi-directional communication service between a particular remote destination and a set-top box user for delivering media from the particular remote destination to the set-top box user and input information from the set-top box user to the particular remote destination. A remote destination during a session of a bi-directional communication service may comprise a remote personal destination such as a friend or a remote vendor that offers a bi-directional communication service for a purchasable period of time in which a viewer communicates real-time with the vendor on a personal basis. In either case, dedicated DDDS resources are allocated to fulfill individualized bi-directional communication over a purchasable period.

Referring again to FIG. 1, the DDDS 10 is composed of content/service providers 15, at least one network operations center (NOC) 20, a high speed distribution network 25, a headend 30, an HFC Network 35 and subscribers' set-top boxes 40. It should be appreciated that although FIG. 1 includes a number of single components (i.e., NOC, headend, HFC network), the DDDS 10 can feature a plurality of each of the illustrated components. The content/service providers 15 represents one or more providers of content, such as video channels, music channels, data channels, video services, audio services and data services. For example, according to one aspect of the invention, a content/service provider 15 could comprise a distributor of movies. According to another aspect of the invention, the content/service providers 15 could represent an Internet Service Provider (ISP) providing data to the system to enable subscribers web access or web-enhanced video via the subscriber's television set. The content/service provider 15 transmits the content to a headend 30 via a high speed distribution network 25 for further transmission to subscribers downstream in the network. Also in communication with the headend 30 is the NOC 20, which is an external management center interfaced with the DDDS 10 to allow for the remote operation of the system. Typically, the high speed distribution network 25 includes one or more satellite and/or fiber optic components and links for high-speed data transmission of content and/or services to the headend 30. It should be appreciated that the high speed distribution network 25 represents hardware and software components for electrically transmitting content and/or services to the headend 30, as opposed to physically carrying or transporting content, such as a video tape or digital video disc, from the content/service provider 15 to the headend 30.

From the headend 30 content and/or services are communicated by a Hybrid/Fiber Coax (HFC) Network 35 to the subscriber set-top boxes 40. The HFC Network 35 typically comprises a plurality of HFC nodes, each which may service a local geographical area. More specifically, content and/or services are provided from the content/service provider 15 via transmission through the headend 30 and HFC Network 35 downstream to one or more taps that connect to a subscriber's set-top box 40 through coaxial cable in a logical tree configuration, which is where the optical-to-electrical and electrical-to-optical conversations of the HFC network 35 take place. It will be appreciated by those of skill in the art that the system 10 may include a number of additional elements, such as Hubs, HFC nodes, taps, network interface units, RF amplifiers, and the like. However, because the general features of a DDDS is well known to those of skill in the art, further description is not contained herein.

Figure 2:
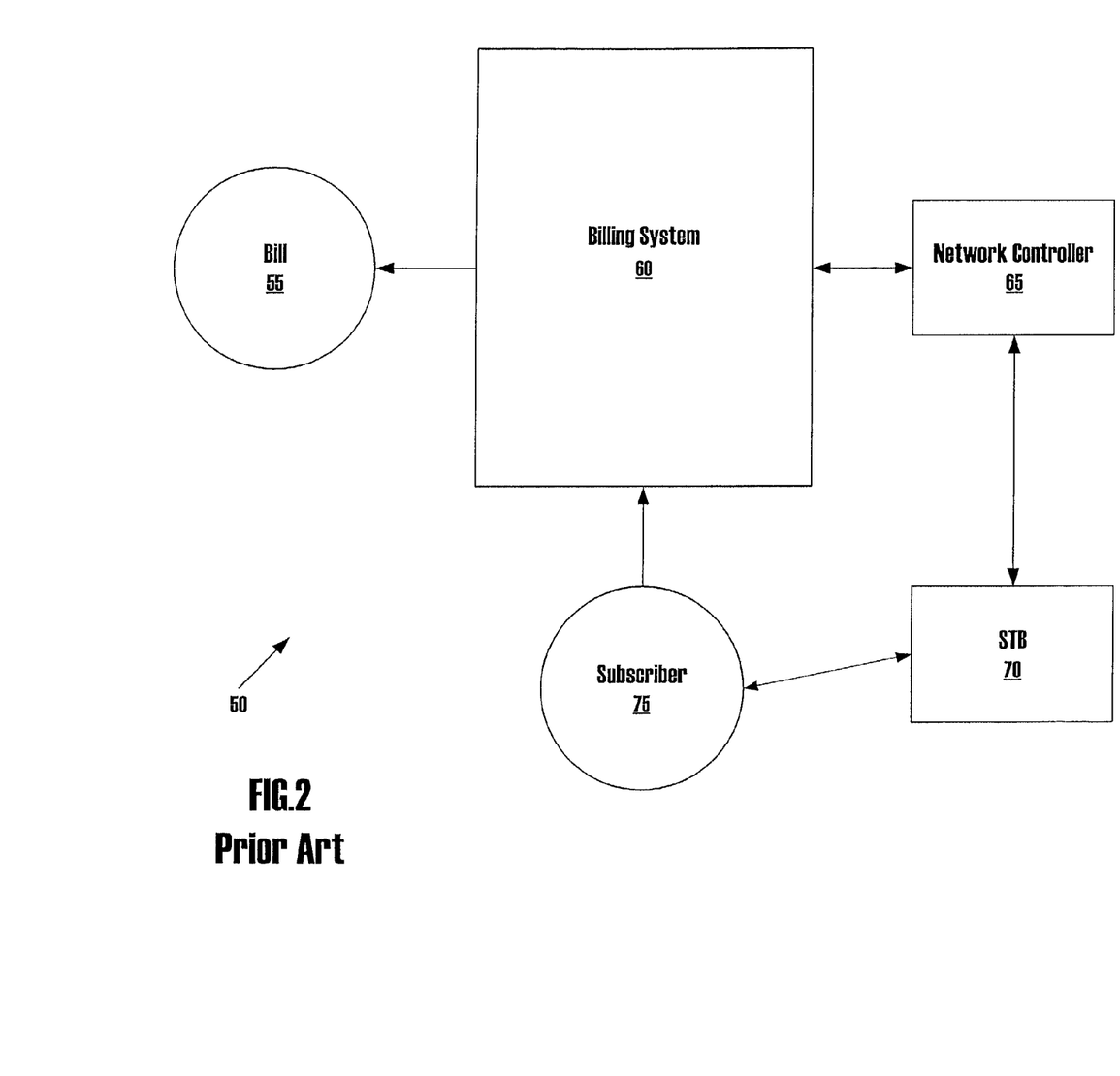
FIG. 2 shows a block diagram of a conventional billing system of the prior art.

FIG. 2 shows a block diagram of components comprising a conventional cable system 50 of the prior art. The system 50 generally includes a billing system 60, network controller 65, STB 70, and subscriber 75. The network controller 65 communicates with the HFC network 35 to allocate system resources to establish communication paths to fulfill service requests. In operation, subscriber 75 requests are transmitted to the billing system 60, which communicates with the network controller 65 and instructs the network controller 65 to fulfill the requested service.

To bill for a particular service item (e.g., a PPV movie) requested by the subscriber, such as via the STB 70 or through a conventional telephone call, a modem or the like, the billing system 60 sends a message to the network controller 65 that instructs the controller 65 to provide the subscriber 75 the service item. This is typically done only if the billing system 60 determines that the subscriber 75 is authorized to receive the requested service item. This determination is made by the billing system 60 through a lookup of a subscriber profile associated with the requesting subscriber, and an analysis as to whether the subscriber profile indicates that the subscriber has sufficient funds and the authority to receive the requested service item. This determination also requires that the billing system 60 know the price of each service item the billing system 60 provisions.

After determining that the subscriber 75 is authorized to receive the requested service item the billing system 60 instructs the controller 65 to transmit a message to the STB 70 that authorizes the STB 70 to receive the service item. The billing system 60 then prints a bill 55 that corresponds to the service item. It will be appreciated that the billing system 60 therefore is not only involved in billing for a service, but in fulfilling or provisioning the service item because the billing system 60 must instruct the controller 65 that the service item should be provided to a STB 70 associated with an authorized subscriber 75. According to one illustrative example, if the subscriber 75 called up the cable company and requested a PPV movie, a customer service representative would be operating a terminal running software provided by the billing system 60 that tells the network controller 65 to authorize the STB 70 to play the movie. The price of the movie, as maintained by the billing service 60, is then added to the subscriber's bill 55.

Figure 3:
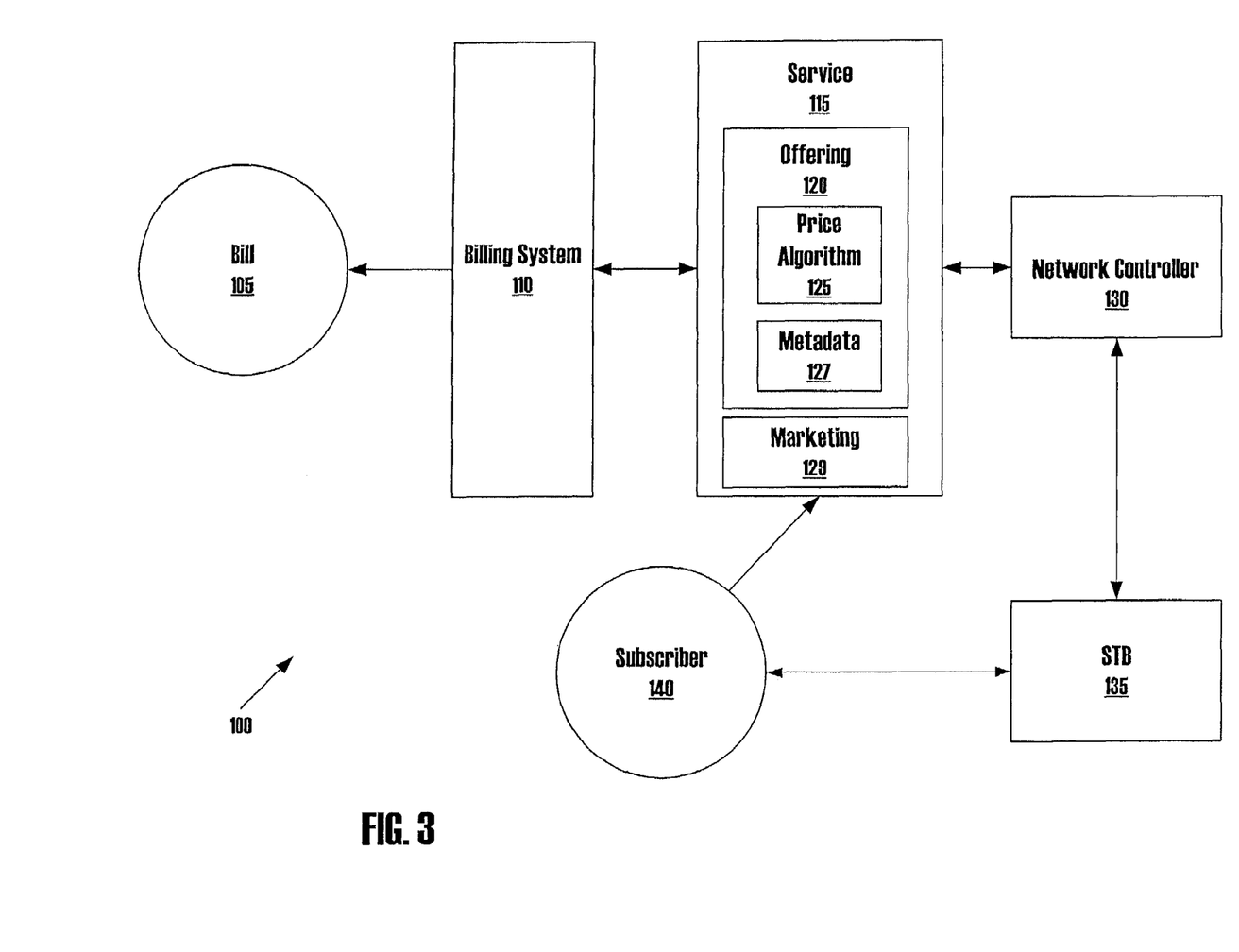
FIG. 3 shows a block diagram view of a billing system of the present invention according to one aspect of the invention.

FIG. 3 shows a block diagram view of components comprising a cable system 100 of the present invention, according to one embodiment of the invention. It should be appreciated that the systems and methods of the present invention are described below with reference to block diagrams and flowchart illustrations of systems, methods, apparatuses and computer program products according to embodiments of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

According to the systems and methods of the present invention, the billing system is only responsible for billing, rather than the provisioning, of services. This allows new services to be quickly added to cable systems without the time consuming and expensive task of configuring the billing system specifically for new services added to the system. Referring now to FIG. 3, components comprising a cable system 100 of the present invention are illustrated. The system 100 includes a billing system 110, a service 115, a network controller 130, a subscriber 140 and a STB 135. The network controller 130, STB 135 and subscriber 140 are identical in form and function to the network controller 65, STB 70 and subscriber 75 illustrated in FIG. 2. However, unlike the system of FIG. 2, where the billing system 60 provisions a service item, the service 115 is responsible for fulfilling a request for a particular service in the system 100 of FIG. 3. It should be appreciated that although only one service 115 is illustrated in FIG. 3, multiple services may be included in the system 100. Furthermore, although the service 115 of FIG. 3 is discussed herein with reference to an MOD service, it should be appreciated that this is a non-limiting example of any type of service that can be implemented in the system 100.

Figure 4:
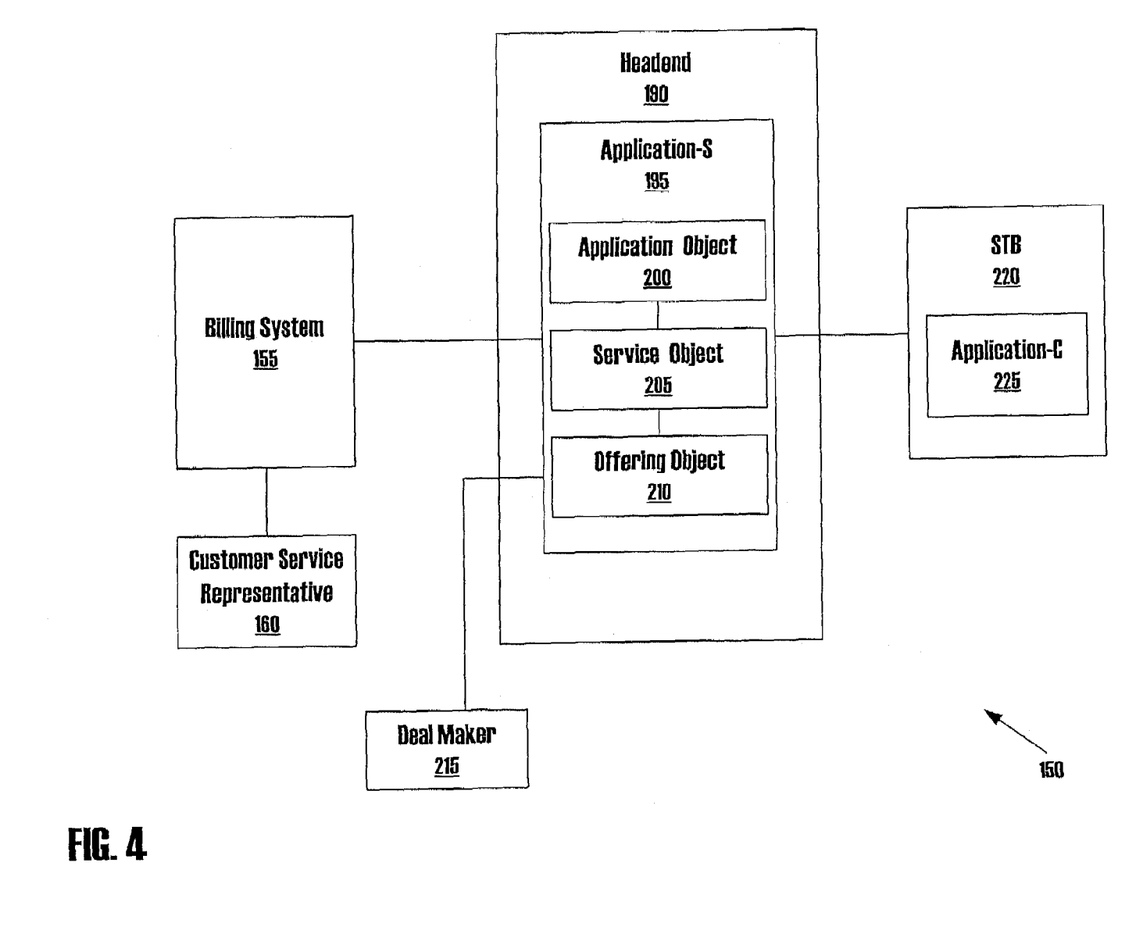
FIG. 4 shows a block diagram view of a billing system of the present invention according to one aspect of the invention.

Services may be located at one or more headends in the cable system 100, and are associated with at least one application for implementing the service, as is discussed in detail with respect to FIG. 4. Therefore, it should be appreciated that there are one or more applications installed in the headend, each of which is associated with one or more services. These applications work in conjunction with subscriber STBs to implement a requested service. Although the service 115 provisions services in the system 100 of FIG. 3, the billing system 110 still provides billing functions as will be described in detail below. By splitting the provisioning function from the billing function the fulfilling of a service, such as authorizing video to be transmitted to a particular STB, systems and methods of the present invention allow new services to be implemented in the system 100 without requiring that an existing billing system 110 be altered to meet the demands of the new service. This results in faster implementation of new services in the network 100. Furthermore, existing system components, such as those illustrated in FIG. 2, do not need to be altered to effect the advantages of the present invention.

To divide the billing function of the billing system 110 from the provisioning function of the service 115, the service 115 generates at least one offering 120, which contains a price algorithm 125 and metadata 127. The offering 120 is used by the system 100 to provision and bill for a service item made available to the subscriber 140 from the service 115. According to one aspect of the invention, offerings are created for each service item that is purchasable by a subscriber 140. For instance, according to one illustrative embodiment of the invention the service 115 may be a Movie-On-Demand (MOD) service that is associated with an MOD application for provisioning the MOD service to enable a subscriber-requested movie to be transmitted to and received at the subscriber's STB. Because a typical MOD service contains multiple movies that are purchasable by a subscriber, the MOD service creates independent offerings associated with each movie. In this example each movie has a corresponding offering because the offering is utilized to implement the service and bill the subscriber for the particular movie purchased from the MOD service. And because each movie is associated with one offering, the offering can be used to create a line item entry on a subscriber bill that corresponds to the purchased movie.

According to one embodiment of the invention, the offering 120 is set up using extensible markup language (XML), though it will be appreciated by those of skill in the art that other methods of creating an offering can be used. Although only one offering is illustrated in FIG. 3, the service 115 can include multiple offerings, each of which include corresponding price algorithms and metadata. The price algorithm is utilized for computing the price of an offering for a particular customer, and the metadata is utilized by the billing system 110 to compute the actual price of an offering 120.

Regardless of the particular type of service 115 implemented in the system 100, each service 115 utilizes offerings 120 to represent an offer to sell a service, or some item of the service, to a subscriber 140. Exactly what the offering represents will depend on the nature of the service 115 that defines the offering 120. For instance, an offering may be a particular channel, stream, session or the like, of AOL television, PPV, MOD, interactive sports, or other well known services. Thus, the offering for an MOD service may be completely different than an offering that allows a subscriber to order a pizza over the Internet. Though the offerings vary according to the service 115 being implemented, the metadata 127 within the offering 120 appears the same to the billing system 110 regardless of the type of service. This allows metadata 127 to be utilized by the billing system 110 to compute the actual price of an offering 120 regardless of the type of offering 120 or service 115 implemented in the system 100.

In generating an offering the service 115 requests a list of all metadata items that the billing system 110 can interpret. This allows the service 115 to create offerings having metadata 127 that is understood by the billing system 110. The service 115 can retrieve this list of metadata items periodically, or the request can be executed by an operator or administrator of the service. An operator creating the offering 120 at the service 115 can therefore view the list of metadata and can generate the offering 120 to include particular items in the offering metadata 127. For instance, where a new interactive service is implemented in the system 100, the service 115 may identify that the billing system 110 is capable of receiving metadata representing the price of an offering, the identity of the subscriber, taxes associated with the subscriber's locality, and additional billing-related information well known to those of skill in the art. Thus, in creating the offering the service 115 will include in the metadata 127 price, identification, tax, and other fields that can be interpreted by the billing system 110. Therefore, in constructing each offering 120 the service 115 ensures that the offering 120 includes sufficient metadata to enable the billing system 110 to bill the subscriber for the appropriate amount for the offering 120. In generating an offering the service not only communicates with the billing system 110 to ascertain the type and form of metadata understood by the billing system 110 such that the service 115 can generate an offering 120 containing generic billing-related metadata understood by the billing system, but also tax-related category information associated with the service 115. Each offering 120 for a particular service 115 is subject to a particular tax structure, which is included in the offering 120 metadata 127.

Because the offering 120 includes particular metadata items, whenever a purchase of the offering 120 is recorded this information is transmitted to the billing system 110 so the billing system 110 can interpret how to generate a bill 105, or a line item on a bill 105, for the service 115. Furthermore, because the billing system 110 handles complex bill-related calculations, the generation of a bill 105, and billing the subscriber, the service 115 must only concern itself with generating an offering 120 having the requisite price information corresponding to the particular offering. Because the service 115, which is typically implemented by software developers, simply requests metadata information with the billing system 110, the service or developers of the service 115 need not know any details about the details of the billing system 110. Likewise, the service 115 need not know any information regarding specialized pricing information such as taxes or franchise fees or the like associated with the provision or purchase of a service offering. Rather, each service 115 implemented in the system 100 must only include an offering 120 that operations personnel can populate with particular information for a service. Thus, there is no need for the developer of the service 115 to know anything about how billing is executed.

As noted above, the offering 120 includes metadata 127 and a price algorithm 125 More specifically, the metadata 127 is used by the billing system 110 to compute the actual price and the price algorithm 125 is used to gather pricing data from one or more marketing components 129 to compute the list price shown to subscribers. This pricing data can include the price, discounts, marketing campaigns and promotions (collectively referred to herein as marketing data) associated with an offering 120. Therefore, the metadata 127 does not include marketing data, which is contained within the price algorithm 125, as noted above. The marketing components 129 can be included within the service 115 (as illustrated) or separate from the service 115, and provide the costs and/or discounts for particular offerings. According to one aspect of the invention, the marketing component 129 can comprise a cable company marketing department which generates the marketing data. According to another aspect of the invention, the marketing component can comprise one or more applications running on servers established by a marketing department or similar marketing entity. For instance, a marketing component within an MOD service may offer subscribers a buy-one-get-on-free deal, in which two movies are offered for the price of one. It should be appreciated that the marketing component considered by the price algorithm 125 to generate discounted prices differs from the billing system 110 in that the marketing component is utilized only to determine a list price which is offered to subscribers for a particular offering or set of offerings. Therefore, the price algorithm 125 computes a list price offered to subscribers, whereas the billing system 110 computes additional costs unrelated to the price offered to subscribers and the ultimate price that will appear on a subscriber's 140 bill 105. For instance, the billing system 110 computes add-on costs such as franchise fees, taxes, and the like, which are not typically presented to a subscriber at the time an offering 120 is presented for purchase.

When a subscriber 140 wishes to purchase the offering 120, the price algorithm 125 is executed to determine the offering's list price based upon marketing data. Thereafter a purchase order is sent to the billing system 110, which examines the metadata 127, and uses the metadata to compute add-ons to the offering price. According to one aspect of the present invention, after the subscriber 140 requests a particular offering for delivery, the service 115 communicates with the controller 130 to request resources to fulfill the service 115, and the billing system 110 is requested to bill for the service. The billing system 110 only receives a message indicating that the offering should be placed on the subscriber's bill 105, and need not know about what is involved in getting the service delivered to the subscriber.

When a purchase is made, it is only the billing portion of the offering that is provided to the billing system 110. The billing system 110 is limited to computing add-on costs the subscriber does not see until receiving the bill 105. For instance, continuing with the illustrative example of an MOD service, where a subscriber orders an MOD, the MOD service or the marketing component 129 establishes a price of the service, which is provided to the price algorithm 125 to compute what a typical subscriber will pay for the offering, the list price of the offering. As is explained in reference to FIG. 4, this list price may further be changed depending upon the identity of a particular subscriber, such that offering price may be tailored to individual subscribers. Also included within the offering 120 in the form of metadata 127 is the billing data that subjects the MOD to taxes, franchise fees, etc. The billing system 110 applies taxes, adds in franchise fees, and executes the processing required to generate financial statements provided on a subscriber's bill 105. To accomplish this processing the billing system 110 may include tax tables corresponding to different services. Therefore, a service may be taxable at a particular rate provided within a table stored by the billing system 110.

It should be appreciated that multiple tax methods may be generated where tax rates and franchise fees are calculated for services, and thus, each offering 120 will refer to a particular tax method. More specifically, the metadata 127 points to a particular tax method which the billing system 110 uses to compute taxes/fees. Knowledge of different types of tax structures is therefore retained in the billing system 110. On the other hand, the service 115 retains information on which particular offerings 120 are associated with a particular tax method. Thus, the service 115 does not know anything about the tax structure itself. The billing system is limited to computing and adding on costs the customer does not see until he receives the bill. According to one preferred embodiment of the invention, this requires that the billing system 110 set up tax structures and franchise fees owed for various categories or types of services. For instance, broadcast services may be taxed at a first rate, and have a franchise fee, while interactive services may be taxed at another rate with a different franchise fee.

FIG. 4 shows a block diagram view of a cable system 150 of the present invention according to one aspect of the invention. The system 150 generally includes a billing system 155, customer service representative (CSR) 160, headend 190, deal maker 215, and STB 220. The billing system 155 is similar to the billing system 110. At least one server located at the headend 190 is running an Application-A (App-S) 195, where App-S 195 implements a service, such as the service 115 of FIG. 3. Although FIG. 4 will be discussed with reference to a single App-S 195 being associated with only one service, there may be many applications like App-S 195 installed in the headend 190, where each is associated with multiple services. As illustrated in FIG. 4, App-S 195 communicates with the STB 220, and more specifically, with the Application-C (App-C) 225 within the STB 220. App-S 195 and App-C 225 run in conjunction with each other to execute offerings and to implement a service on the STB 220. Typically, App-C 225 and App-S 195 are one piece of software created as a unit, and are not required to be interoperable with other network services. A developer of App-S 195 and App-C 225 can utilize whatever protocol works on the HFC network, which can include the headend 190. Facilities in the HFC network can be used to implement this communication, which can occur using Internet protocol, broadcast file system (BFS), pass-through messaging (part of the DSM-CC standard), a modem, or the like.

As an illustrative example, App-C 225 may be a Watch-TV application, which digitally tunes the STB 220 to a particular channel. If, for instance, in a particular cable system channel 500 corresponds to CNN, then App-C 225 running on the STB 220 provides the STB 220 a particular frequency and the required data fields that enables the STB 220 to tune to CNN when the subscriber selects channel 500. In another illustrative example, App-C 225 may present a list of offerings (e.g., including offering 120 of FIG. 3) for purchase by a subscriber from a service. Preferably the offerings are presented to the subscriber via a graphical user interface (GUI), and selectable by the subscriber through the use of a remote control that allows the subscriber to navigate the GUI and select an offering. Alternatively the user may view the offerings that are presented on a television set and utilize a telephone to purchase a particular offering. Regardless of the method used to display and accept an offering, once the subscriber has selected an offering, App-C 225 transmits a message to the App-S 195 identifying the offering purchased by a subscriber.

According to one embodiment of the present invention, every application includes a number of objects, or interfaces, for executing one or more services and for facilitating the billing of the subscriber for usage of the services. As shown in FIG. 4, App-S 195 includes an application object 200, service object 205 and offering object 210. The application object 200 is that part of the application that must be exported by the App-S 195 to run the application on the STB 220. The service object 205 is the application plus one or more parameters that define the particular service implemented by the App-S 195. For instance, where Watch-TV represents the App-S 195, CNN may be a service implemented by the Watch TV service.

Different parameters provided to Watch-TV, on the other hand, may result in an HBO service. Therefore, for each App-S there may be many services definable by the service object 204. Last, the offering object 210, also referred to herein as the offering, defines the particular service item offered to a subscriber for purchase. For instance, the offering object 210 may comprise a particular movie purchasable by a subscriber from a MOD service.

After an offering is transmitted to the STB 220 and selected for purchase by a subscriber, a buy request is transmitted from the STB 220 to the App-S 195. Upon receipt of the buy request from the STB 220, the App-S 195 will first determine the identity of the STB 220 that submitted the buy request. The identity of the STB 220 is determined by examining the MAC address of the STB 220, which is transmitted to the App-S 195 with the buy request. MAC addresses, as are well known in the art, are unique addresses associated with each STB 220. Because the App-S 195 does not maintain a database of STB MAC addresses, or the subscribers associated with MAC addresses, the App-S 195 transmits a subscriber identification request to the one or more network components that maintain such information. The subscriber profile associated with the STB 220 MAC address is retrieved, and identifies the subscriber whose account will be responsible for paying for the offering 210. Because the request may originate from a home having multiple residents, it will be appreciated that the subscriber identified will typically be the resident responsible for paying for the cable service. However, it will also be appreciated by those of skill in the art that each resident may have one or more codes, passwords or IDs that may be required to be input along with the buy request, such that a particular person associated with that request can be identified and billed.

Upon receiving the subscriber identity from the equipment object, the App-S 195 can create a purchase, which is a link between an offering and a subscriber identifying what is being purchased, and by which subscriber. The App-S 195 then calculates the offering price, utilizing the price algorithm contained within the offering 210 and marketing data provided by the marketing components and, according to one aspect of the invention, the deal maker 215.

Because the offering price takes into account both the offering 210 and the subscriber purchasing the offering 210, this is the first point at which the offering price can be determined for the particular subscriber making the purchase. For instance, although an offering 210 may be associated with a particular price set up by the service generating the offering 210 and available to typical subscribers regardless of subscriber identity, a particular subscriber profile may result a better price of the offering 210, such as where a special marketing event occurs for a class that includes the subscriber. Additionally, a subscriber's service record may be considered to determine in the subscriber is eligible to receive discounts. For instance, because a subscriber may purchase many MODs, the subscriber may become eligible for a special rate for a MOD. Additionally, as noted above with respect to FIG. 3, a marketing server may also identify discounts to all subscribers regardless of their identity. As noted above, the offering price may include data provided by the deal maker 215. The deal maker 215 is a rules engine for determining discounts for subscribers based on the subscriber's purchase history and the services offered in the system. According to one aspect of the invention, the deal maker 215 is an application implemented by a server that may be separate from the one or more marketing applications 129 illustrated in FIG. 3, as the deal maker 215 can include rules that apply across multiple services rather than specific to one service being implemented. The offering 210 can communicate with the deal maker 215 to request deal data associated with a particular offering.

Thus, after the offering price is calculated, taking into account any special offers or discounts provided by the deal maker 215, an eligibility check is made to determine if the subscriber has sufficient funds or credit to receive the purchased offering. To make this determination the APP-S 195 requests a credit check from the billing system 155, which will determine whether the subscriber has credit to receive the offering. The billing system will then acknowledge that the subscriber has sufficient credit, or indicate that the subscriber should not be able to purchase the selected offering. This may utilize a CSR 160 in communication with the billing system 155. If the subscriber is authorized to receive the service offering, the App-S 195 will then provision the offering 210.

According to one aspect of the invention that the price of an offering may be calculated based upon a price per unit. For instance, where the subscriber orders a MOD, each movie may correspond to one unit. In this embodiment, only after the price per unit is transmitted to the APP-S 195 will the App-S 195 respond with the number of units requested by the subscriber. According to one aspect of the invention this occurs after the credit check request is made to the billing system. Finally, the units established by the App-S 195 may be multiplied by the unit price and forwarded to the billing system 155 for inclusion on a subscriber bill. This allows the system 150 to bill for services that may be based upon time, such as Internet service. Thus, when a subscriber logs onto the Internet a unit price may be calculated, such as a price per minute. Not until after the subscriber completes accessing the Internet will the number of minutes the subscriber accessed the Internet be identified so that a line item can be created and forwarded to the billing system 155. This allows a service to be billed on a usage basis.

According to the systems and methods of the present invention, the billing system is only responsible for billing, rather than the provisioning, of services. This allows new services to be quickly added to cable systems without the time consuming and expensive task of configuring the billing system specifically for new services added to the system.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A digital distribution and delivery system comprising a hybrid fiber coax network facilitating the provisioning and billing of a service available for purchase to a subscriber associated with a set top box, comprising:

a provisioning system comprising a first server executing a service application program implementing the service, said service application program comprising a price algorithm and metadata both associated with a service offering wherein the service application program is configured to receive a purchase request for the service offering from the set top box and in response said purchase request compute a list price associated with the service offering using the price algorithm prior to fulfilling said purchase request, said service application program configured to generate one or more billing messages indicating an identifier of the set top box, the service offering, the list price, and the metadata;

a billing system comprising a computer receiving said one or more billing messages from the provisioning system, the billing system configured to generate an amount billed to the subscriber for the service offering wherein the amount billed comprises the list price and an additional amount, wherein the meta data is used by the billing system to determine the additional amount; and a network controller configured to receive a provisioning message for provisioning the service offering for the set top box connected to the hybrid fiber coax network.

2. The digital distribution and delivery system of claim 1, wherein the billing system maintains at least one table comprising tax-related information associated with the service offering that is used by the billing system to determine the additional amount.

3. The digital distribution and delivery system of claim 1, wherein the additional amount comprises a plurality of tax amounts and the metadata comprises a plurality of billing items which are used to compute the plurality of tax amounts.

4. The digital distribution and delivery system of claim 1, further comprising a marketing component, wherein said marketing component provides marketing data associated with the service offering used by said price algorithm to determine said list price.

5. The digital distribution and delivery systems of claim 1 further comprising:

a network controller in communication with the service application program to provision the set top box to receive digital content associated with the requested service offering.

6. The digital distribution and delivery system of claim 1, wherein the network controller provisions the set top box to receive said service offering.

7. The digital distribution and delivery system of claim 6, wherein said network controller is capable of receiving a command from the service application program to provision the set top box.

8. A method of facilitating the provisioning and billing of a service for a subscriber in a digital distribution and delivery system comprising a hybrid fiber coax network, comprising the steps of:

receiving at a service application program executing in a server of a provisioning system in the digital distribution and delivery system, a purchase request for a service offering comprising an indication of the service offering from a set top box connected to said hybrid fiber coax network, said service application program comprising a pricing algorithm and meta data both associated with the service offering;

ascertaining an identification of the set top box making the purchase request as indicated in the purchase request;

processing the purchase request at the service application program in response to receiving said purchase request using a pricing algorithm associated with the service offering to determine a list price of the service offering;

providing the identification of the set top box, the indication of the service offering, the list price, and the meta data from the provisioning system to a billing system comprising a computer, wherein the billing system calculates a charge for the service offering for the subscriber associated with the set top box prior to fulfilling said purchase request, wherein the charge comprises the list price and an additional amount wherein said additional amount is calculated using said metadata; and providing a provisioning message to a network controller provisioning the service offering for the set top box connected to the hybrid fiber coax network.

9. The method of claim 8, further comprising the step of:

generating a bill for said subscriber at said billing system for said service offering, said bill indicating the charge wherein the charge comprises said additional amount.

10. The method of claim 9, wherein calculating said charge for said service offering using said metadata comprises accessing at least one tax related table stored in said billing system to determine at least one tax associated with said service offering.

11. The method of claim 8, further comprising the step of:

provisioning said service offering in the set top box by generating a second provisioning message conveyed over the hybrid fiber coax network from the network controller to the set top box.

12. The method of claim 11, further comprising the steps of:

determining in said billing system said subscriber is authorized to receive said service offering; and providing from said billing system to said service application program an indication that said subscriber is authorized to receive said service offering.

13. The method of claim 11, further comprising the step of:

instructing the network controller to distribute content associated with said offering to said set top box.

14. The system of claim 1 further comprising:

a marketing server providing discount data to the provisioning system, wherein said provisioning system uses said discount data in computing said list price.

15. The method of claim 8 further comprising:

providing discount data from a marketing server to the service application program, and determine said list price of the service offering by further using said discount data.

* * * * *

UNITED STATES PATENT AND TRADEMARK OFFICE
CERTIFICATE OF CORRECTION

PATENT NO. : 7,620,574 B2
APPLICATION NO. : 10/054719
DATED : November 17, 2009
INVENTOR(S) : Buehl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1942 days.

Signed and Sealed this

Twenty-sixth Day of October, 2010

David J. Kappos
*Director of the United States Patent and Trademark Office*